United States Patent
Stahl et al.

[11] Patent Number: 6,091,809
[45] Date of Patent: *Jul. 18, 2000

[54] METHOD OF ESTABLISHING A CONNECTION, AS WELL AS EXCHANGES AND A SERVICE CONTROL UNIT

[75] Inventors: Uwe Stahl, Leonberg; Wolfgang Lautenschlager, Weissach-Flacht, both of Germany

[73] Assignee: Alcatel, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,655

[22] Filed: May 20, 1997

[30] Foreign Application Priority Data

May 30, 1996 [DE] Germany .............................. 196 21 717

[51] Int. Cl.⁷ ...................................................... H04M 3/42
[52] U.S. Cl. .......................... 379/207; 379/221; 379/220
[58] Field of Search .................................... 379/219, 220, 379/229, 230, 207

[56] References Cited

U.S. PATENT DOCUMENTS

| | | |
|---|---|---|
| 5,023,868 | 6/1991 | Davidson et al. . |
| 5,051,992 | 9/1991 | Taniguchi et al. . |
| 5,181,558 | 1/1993 | Medamana et al. . |
| 5,375,167 | 12/1994 | Bales et al. . |
| 5,625,681 | 4/1997 | Butler, II .............................. 379/220 X |
| 5,732,131 | 3/1998 | Nimmagadda et al. ............. 379/230 X |
| 5,764,745 | 6/1998 | Chan et al. .......................... 379/220 X |
| 5,793,857 | 8/1998 | Barnes et al. ....................... 379/229 X |

FOREIGN PATENT DOCUMENTS

| | | |
|---|---|---|
| 4321458 | 7/1995 | Germany . |
| 4424558 | 1/1996 | Germany . |
| 9606498 | 2/1996 | WIPO . |

OTHER PUBLICATIONS

"High level service description for number portability" by "Public Network Operators—Interest Group", Jun. 29, 1994.

*Primary Examiner*—Creighton Smith
*Attorney, Agent, or Firm*—Ware, Fressola, Van der Sluys & Adolphson LLP; Milton Oliver

[57] ABSTRACT

The invention concerns a method of establishing a connection, as well as exchanges and a service control unit to carry out the method of establishing a connection. A calling subscriber (A) requests a connection to a called subscriber who is assigned to a geographical area (LOC2), whose number range is shared by two or more subscriber access networks (LN21 to LN23) of different network operators (OP21 to OP23). To establish the requested connection, a connection request is routed to the subscriber access network (LN23) of the called subscriber (B) via one or several communications networks (LN1, TN2). As part of the connection request and in addition to a directory number (N) which determines the called subscriber (B) within the number range of the geographical area (LOC2), a separate operator code (KOP23) is also transmitted, which determines the network operator (OP23) of the subscriber access network (LN23) of the called subscriber (B). A subscriber access assigned to the called subscriber (B) is then determined by means of the directory number (N) and the operator code (KOP23).

19 Claims, 3 Drawing Sheets

METHOD OF ESTABLISHING A CONNECTION, AS WELL AS EXCHANGES AND A SERVICE CONTROL UNIT

TECHNICAL FIELD

The invention concerns a method of establishing a connection wherein a calling subscriber requests a connection to a called subscriber who is assigned to a geographic area whose number range is shared by two or more subscriber access networks of different network operators, and wherein to establish a requested connection, a conection request is routed through one or more communications networks to the subscriber access network of the called subscriber.

It is also directed to an exchange with a receiver unit for receiving a connection request asking for a connection from a calling subscriber to a called subscriber, with means for evaluating or for changing a connection request asking for a connection to a called subscriber of a geographical area whose number range is shared by two or more subscriber access networks of different network operators, and with means for further routing a connection request to one of several other exchanges.

It is still further directed to a service control unit for establishing a connection from a calling subscriber to a called subscriber, with a receiver unit for receiving a directory number which is entered into a connection request asking for the connection, and with means to evaluate a received directory number which determines the called subscriber within the number range of a geographical area, whose number range is shared by two or more subscriber access networks of different network operators.

BACKGROUND OF THE INVENTION

With the usual methods of establishing a connection, a connection request is routed to the called subscriber by means of a directory number of the called subscriber which is entered therein. The directory number predetermines the path through the communications network and is evaluated step by step along the way, i.e. it first addresses the local network area and the subscriber exchange and then the access of the called subscriber within the number range of the subscriber exchange. In this method, number portability is only possible within the number range of a subscriber exchange.

U.S. Pat. No. 5,375,167 indicates the possibility of enabling number portability within a larger number range.

With the method described therein, the number ranges of several subordinated exchanges are managed by a superordinate exchange. When needed in this case, blocks of numbers are requested by one of the subordinated exchanges and are assigned by the superordinate exchange. The call is subsequently routed by the superordinate exchange in accordance with the established assignments.

However, with all of these methods it is not possible to provide call number portability between the subscriber access networks of different network operators in a deregulated communications environment in which several competing subscriber access networks of different network operators are available in the same geographical area.

SUMMARY OF THE INVENTION

The invention starts with a method of establishing a connection in a deregulated communications environment, as proposed in the report "High level service description for number portability" by "Public Network Operators Interest Group", Jun. 29, 1994, as a possible solution for the implemention of call number portability in the United Kingdom (UK).

Call number portability is implemented by translating the directory number by means of call forwarding or by means of an IN (Intelligent Network) service. If a subscriber in a local network area changes from a first network operator to a second network operator and wishes to take his directory number with him, such call forwarding is installed in the access network of the first network operator. If a connection request containing this directory number is recognized by a service of the first network, the connection request is routed to the second network.

This routing is implemented by entering a new directory number instead of the original directory number in the connection request, which addresses the called subscriber in accordance with a second addressing formula especially created for this case.

This establishment of a connection carries with it the disadvantages that two different types of addresses for the subscriber must be supported, and that twice as many directory numbers are used up per subscriber. Among other things this leads to problems with the limited supply of directory numbers in public telephone networks (15 digits as of Jan. 1, 1997).

The invention now has the task of making call number portability possible between subscribers of different network operators sharing one and the same number range. This task is fulfilled by a method of establishing a connection wherein a calling subscriber requests a connection to a called subscriber who is assigned to a geographic area whose number range is shared by two or more subscriber access networks of different network operators, and wherein to establish a requested connection, a connection request is routed through one or more communications networks to the subscriber access network of the called subscriber, wherein as part of the conection request, in addition to a directory number which designates the called subscriber within the number range of the geographical area, a separate operator code is transmitted which determines the network operator of the subscriber access network of the called subscriber, and that a subscriber line associated with the called subscriber is determined by means of the directory number and the operator code.

The task is also fulfilled by an exchange with a receiver unit for receiving a connection request asking for a connection from a calling subscriber to a called subscriber, with means for evaluating a connection request asking for a connection to a called subscriber of a geographical area whose number range is shared by two or more subscriber access networks of different network operators, and with means for further routing a connection request to one of several other exchanges, wherein the evaluating means are configured so that the further exchange is determined by means of a separate operator code for a subscriber access network operator of the geographical area, which is transmitted as part of the connection request in addition to a directory number which determines the called subscriber within the number range of the geographical area.

The task is further fulfilled by an exchange with a receiver unit for receiving a connection request asking for a connection from a calling subscriber to a called subscriber, with means for changing a connection request asking for a connection to a called subscriber of a geographical area, whose number range is shared by two or more subscriber access networks of different network operators, and with means for further routing the changed connection request, wherein the means for changing are configured so that in addition to a directory number of the called subscriber, which is already entered into the number range of the geographical area, a separate operator code for a subscriber access network operator of the geographical area is entered into the connection request.

The task is also fulfilled by a service control unit for establishing a connection from a calling subscriber to a called subscriber, with a receiver unit for receiving a directory number which is entered into a connection request asking for the connection, and with means to evaluate a received directory number which determines the called subscriber within the number range of a geographical area, whose number range is shared by two or more subscriber access networks of different network operators, wherein the evaluating means are configured to determine an operator code from the directory number of the called subscriber, which identifies the network operator of that subscriber access network of the geographical area to which the called subscriber is assigned, and that it causes this operator code to be entered into the connection request in addition to the directory number.

The invention is based on the idea of transporting, in addition to the directory number which describes the subscriber in the number range of a geographical area, a code within the connection request which describes the network operator in the access area to whom the subscriber is assigned. In this way the network operator represents an additional redundant dimension of addressing a subscriber line. Introducing this code makes a simpler and above all uniform call routing possible, in which a connection request can only be routed to the called subscriber by evaluating these parameters.

In the simplest case the geographical area is a local network area. However it can also be the area of an entire country or continent. Only the common number range used by several subscriber access network operators is the deciding factor.

A translation and change of the directory number is not required with this method, thus no accounting problems occur, nor problems with the limited supply of directory numbers in public telephone networks.

A further advantage is that such a method of call routing can be integrated in the telephone network of today without major intervention.

In this case the operator code is advantageously determined from the directory number of the called subscriber by means of an IN service and is entered into the connection request.

It is however also possible for the operator code to be determined by the subscriber's terminal which causes the operator code to be entered into the connection request. In this way an emergency operation can be implemented in a simple and cost-effective manner if the IN service fails.

Beyond that, using the method of the invention can implemented an emergency operation in a much simpler fashion than with the known call routing methods. If the translation device had failed, said methods would not allow finding the new directory number produced from the original directory number and therefore the desired subscriber connection.

BRIEF DESCRIPTION OF THE DRAWINGS

The invention is explained as an example in the following by means of a configuration example with the help of the attached drawings wherein.

BEST MODE FOR CARRYING OUT THE INVENTION

The configuration example explains the performance of the method of the invention for call routing within a communications system with exchanges according to the invention and a service control unit according to the invention.

Figure 1:
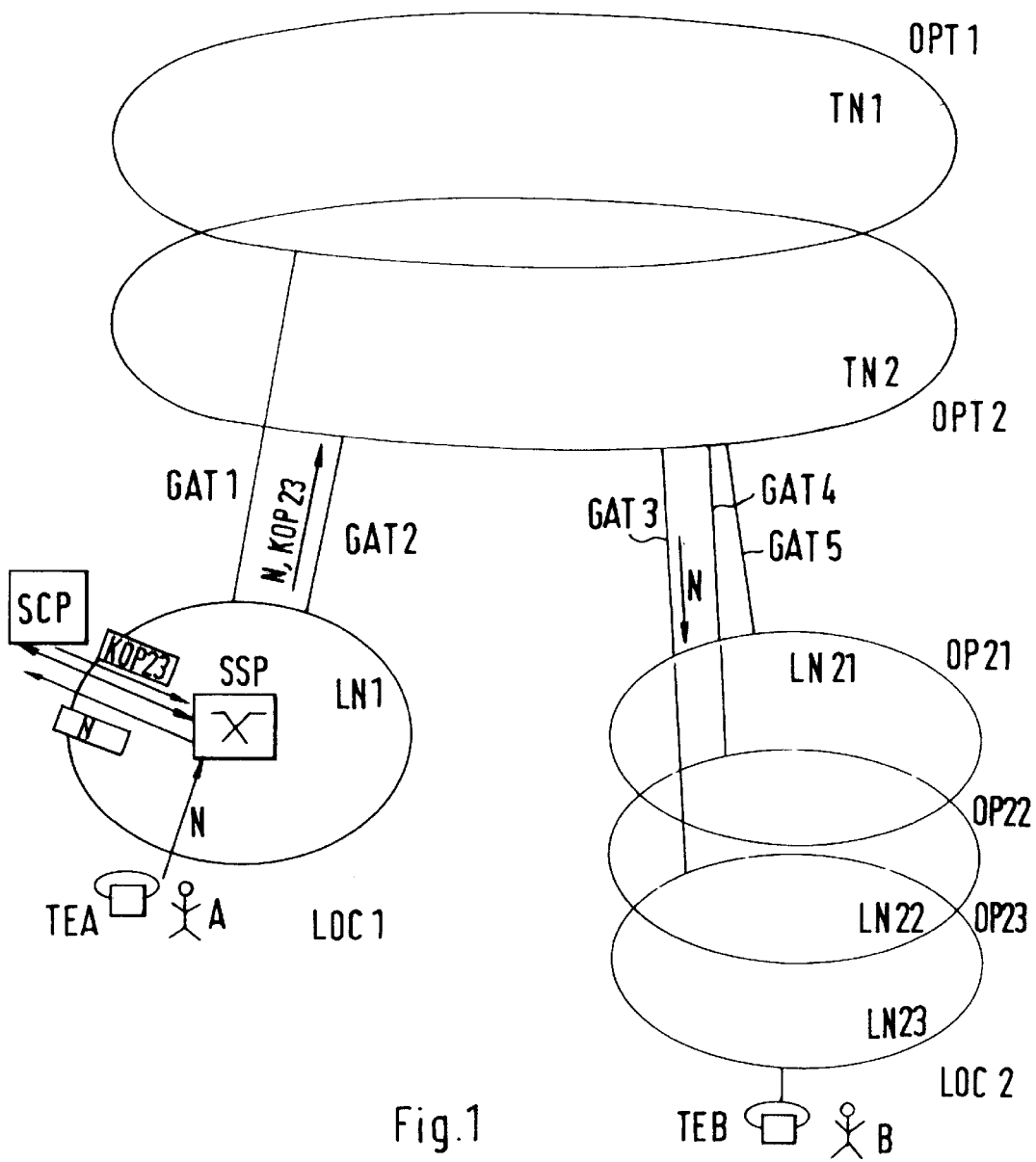
FIG. 1 is a block diagram of a communications system.

FIG. 1 illustrates a communications system with two toll networks TN1 and TN2 and 4 subscriber access networks LN1 to LN23. The subscribers in a local network area LOC1 are connected via the subscriber access network LN1, and in a local network area LOC2 via the subscriber access networks LN21 to LN23. Of the terminals connected to the subscriber access networks LN1 to LN23 only two terminals TEA and TEB are shown as an example, which are connected to the subscriber access network LN1 or LN23 and are assigned to two subscribers A or B. The subscriber access networks LN1 or LN23 are connected to the toll networks TN1 and TN2 via network gateways, of which five gateways GAT1 to GAT5 are shown as an example.

The toll networks TN1 and TN2 represent conventional toll networks used to establish toll network connections between exchanges. In this case the toll networks TN1 and TN2 are assigned to two different toll network operators OPT1 and OPT2.

Both toll networks TN1 and TN2 are connected in a similar manner to the subscriber access networks of the local network areas, so that connections between subscriber access networks of different local network areas can be established via toll network TN1 as well as via toll network TN2. In this way it is possible to choose between two possible toll networks TN1 and TN2 for every toll connection, and thereby between two toll network operators OPT1 and OPT2 which may have different conditions for establishing toll connections.

It is also possible for the communications system to have only one toll network for connecting the subscriber access networks of the local network areas LOC1 and LOC2.

The subscriber access networks LN1 or LN23 are conventional access networks for connecting telephone terminals and private branch exchanges. Potential telephone terminals in this case are telephones, fax machines, but also modems and interface boards for connecting data processors. These can be analog terminals as well as ISDN (Integrated Services Digital Network) terminals. Terminals TEA and TEB are such telephone terminals.

The subscriber access networks LN1 to LN23 are made up of one or several subscriber exchanges. Of these subscriber exchanges one exchange SSP of subscriber access network LN1 is shown as an example. All the subscriber terminals assigned to one of the subscriber access networks LN1 to LN23 are connected via subscriber access lines with such an exchange of the respective subscriber access network. Due to the higher traffic load, larger subscriber access networks can also contain transit exchanges. The exchanges of a subscriber access network are connected by transverse lines with each other, and with one or several transit exchanges of toll networks TN1 and TN2. It is also possible for exchanges of different subscriber access networks LN21 to LN23 to be interconnected by transverse lines.

It is also possible for the subscriber access networks LN1 to LN23 to be radio networks, for example mobile radio networks according to the GSM (Global System for Mobile Communications) standard, or radio networks according to the DECT (Digital Enhanced Cordless Telephone) standard. Such radio interfaces can also be components of one or several exchanges of the subscriber access network, i.e. only a portion of the subscribers of the access network is connected via one or several radio networks.

The subscriber access networks LN21 to LN23 are assigned to three different network operators OP21 to OP23. Since the subscriber access networks LN21 to LN23 cover the same local network area LOC2, the subscriber access networks LN21 to LN23 share the number range of the local network area LOC2. In this way the subscriber access networks LN21 to LN23 are available in parallel with each other to the subscribers residing in the same geographical area. In this way the subscribers of the local network area LOC2 can choose via which of subscriber access networks LN21 to LN23 their terminal or terminals are connected. Selecting the subscriber access network determines the subscriber network operator and thereby the applicable condition for the subscriber connection. In contrast to the selection of the toll network operator which is an individual connection, selection of the subscriber access network represents a determination which must be known in the communications system in order to find the subscriber. In this way the selection of the subscriber access network operator represents a degree of freedom of the called subscriber and not a degree of freedom of the calling subscriber.

The following describes the establishment of a connection between subscribers of different local network areas, namely the calling subscriber A and the called subscriber B:

Through his terminal TEA, subscriber A sends a connection request with a directory number N of the called subscriber B to the subscriber switching center SSP via which terminal TEA is connected.

The switching center SSP is a specially configured exchange which provides telecommunication services by means of a service control unit SCP.

By means of the service control unit SCP the switching center SSP determines whether the connection request is directed to a subscriber of a local network area in which several subscriber access network operators are located. If this is the case, a message with the directory number N is sent to the service control unit SCP, which determines from this directory number N the subscriber access network operator assigned to the called subscriber, namely network operator OP23. A message with the corresponding operator code KOP23 is sent back to the switching center SSP. The code KOP23 is then entered by the switching center SSP into the connection request in addition to the directory number N.

In this case the connection request consists of a single or several sequentially transmitted signalling data packets, which are routed by one or several communications networks, in this case communications networks LN1, TN2 and LN23, from the calling subscriber to the exchange of the called subscriber. This or these signalling data packets contain target information which controls the routing guidance in the exchanges through which this packet or these packets pass, in order to establish a connection between the calling and the called subscriber.

It is also possible that the determination of the subscriber access network operator of the called subscriber is carried out by a logic of the switching center SSP, and the service control unit SCP is thereby integrated in the switching center SSP.

In addition to the code for the subscriber access operator, a code for the toll network operator is also entered into the connection request. The latter is not dependent on the called subscriber and can be freely chosen by subscriber A. The desired toll network operator, namely toll network operator OPT2, is signalled to the exchange by subscriber A through his terminal TEA, and is subsequently entered into the connection request.

It is also possible however that the selection of the toll network operator has already been established for subscriber A in a data set of the switching center SSP, and that such signalling is therefore omitted. The same applies if it is not possible to select a toll network operator.

The connection request is now routed further by the switching center SSP to an exchange of the toll network TN2, based on the directory number N and the toll network operator code OPT2. In accordance with the directory number N, the connection request is then routed by the toll network TN2 to the particular transit exchange which is responsible for the local network area LOC2.

It is also possible for several transit exchanges to be responsible for the local network area LOC2 and that in this way the operator code KLN23 is already evaluated previously by the toll network TN2.

The directory number N indicates to this transit exchange that the connection request must be routed further to a subscriber exchange of the local network area LOC2. The operator code KLN23 indicates that the connection request must be routed to the subscriber access network LN23. On the basis of this evaluation of the directory number N and the operator code KLN23, the transit exchange then routes the connection request to a previously determined exchange of the subscriber access network LN23 via network gateway GAT3. The evaluation of the operator code thus takes place during the transition from the toll network to the local network area.

If several network gateways are available between the toll network TN2 and the subscriber access network LN23, the transit exchange can route the connection request further to one of several previously determined exchanges of subscriber access network LN23. This selection takes place in accordance with a predetermined formula, or on the basis of the directory number N.

By evaluating the directory number N, this exchange then routes the connection request inside the subscriber access network LN23 to that subscriber exchange which provides the connection for the terminal TEB of subscriber B.

The target subscriber exchange then signals a call to the terminal TEB and makes the connection thereto when the subscriber B lifts off the receiver.

The following describes the establishment of a connection between subscribers who are assigned to the same local network area but to different subscriber access networks.

If the subscriber exchange to which the calling subscriber is connected recognizes that such a connection request is not directed to one of its subscribers, it determines the operator code of the subscriber access network to which the called subscriber is assigned from the directory number analogously as above, and then enters the operator code into the connection request. Based on the directory number this exchange then routes the connection request further to an exchange of the subscriber access network, which performs a transit function. By means of the operator code, this exchange then selects that bundle of transverse lines which provides a network gateway to the subscriber access network of the network operator identified by the operator code.

It is also possible that there is no bundle of transverse lines between the subscriber access networks of a local network area. In that case the connection request would be routed to one of the transit networks which then routes the connection request to the target subscriber access network on the basis of the operator code. The connection is subsequently established via the transit network.

It is also possible that the subscriber exchange to which the calling subscriber is connected takes over this transit function by itself.

Figure 2:
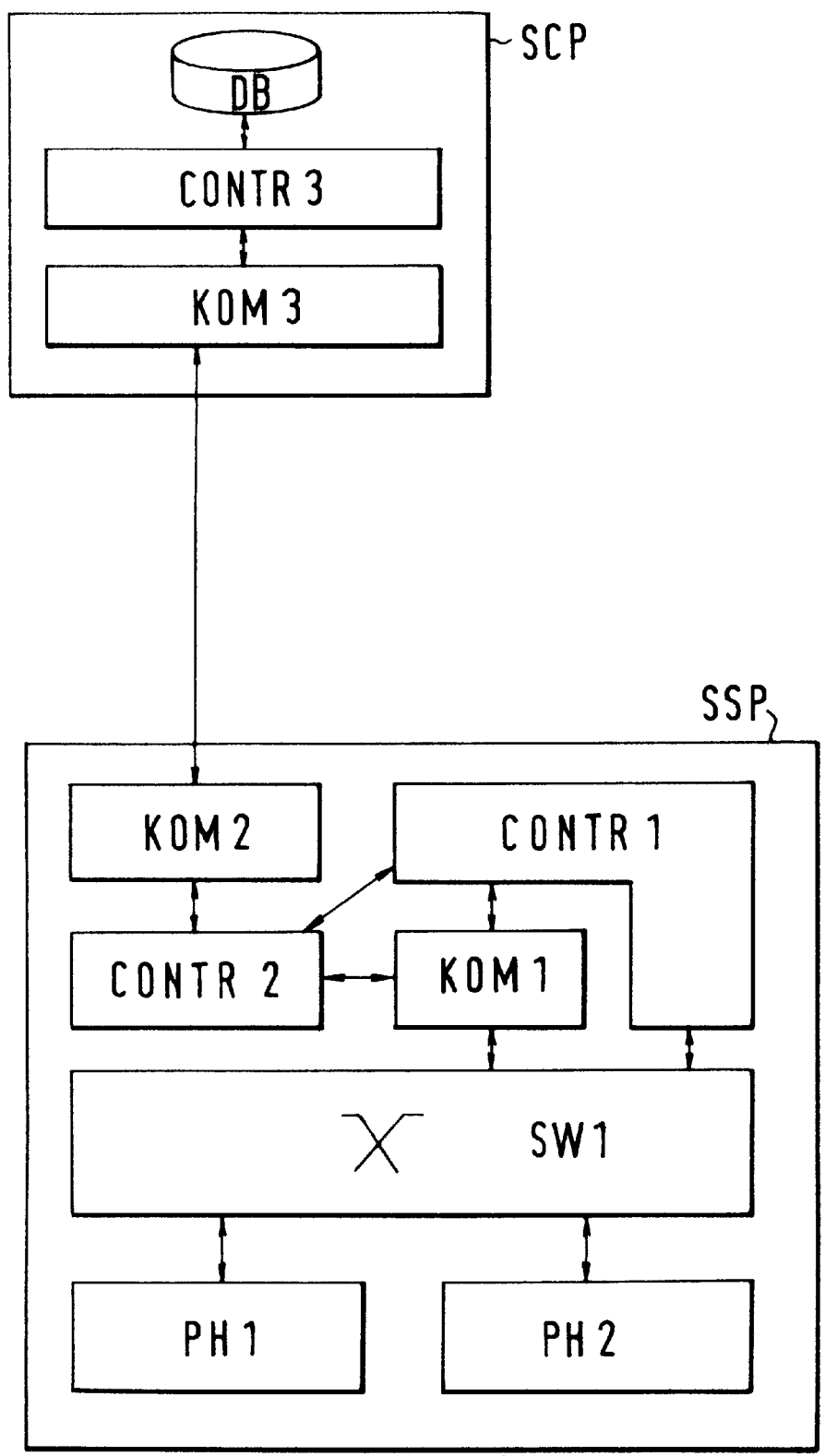
FIG. 2 is a block diagram of an exchange according to the invention, and a service control unit according to the invention for the communications system in FIG. 1.

FIG. 2 now explains in detail the structure of the switching center SSP and the service control unit SCP, whereby the operator code is determined and entered into the connection request.

FIG. 2 illustrates the switching center SSP and the service control unit SCP which are interconnected. The switching center SSP contains a switching network SW1, two attachment unit interfaces PH1 and PH2, two control units CONTR1 and CONTR2 and two communications units KOM1 and KOM2. The service control unit SCP contains a data bank DB, a control unit CONTR3 and a communications unit KOM3.

The attachment unit interfaces PH1 and PH2 and the communications unit KOM1 exchange data via the switching network SW1, which is controlled by the control unit CONTR1. The control unit CONTR2 exchanges control data with the control unit CONTR1 and the communications units KOM1 and KOM2. The control unit CONTR3 has access to the data bank DB and exchanges data with the communications unit KOM3, which in turn is connected to communications unit KOM2 and thus establishes the connection to the switching center SSP.

The attachment unit interfaces PH1 and PH2 provide functions which enable the subscriber to access the terminals, particularly the terminal TEA, and the connection by bundles of transverse lines to other exchanges.

The communications unit KOM1 contains the necessary functional hardware and software groups which enable the reception of connection requests from terminals and the sending of connection requests to other exchanges. In this case the received and the transmitted connection requests may have different forms, for example ISDN or analog connection requests (impulse or multifrequency dialing) are received and connection requests are sent in accordance with the no. 7 signalling system.

The communications units KOM2 and KOM3 provide the transmission of messages between the switching center SSP and the service control unit SCP. In this case the exchange of messages corresponds to the mechanisms established by the IN (Intelligent Network) concept. In this way it is possible for example for other exchanges to be also connected to the service control unit SCP in the same manner, and in this way the latter provides its service centrally for several exchanges. It is not necessary for said exchanges to be assigned to the same network operator or to the same local network area.

The control units CONTR1 and CONTR2 comprise control programs which run on the data processing platform of the switching center SSP. In this case the control unit CONTR1 is responsible for the usual control when a connection is established.

The control unit CONTR2 is responsible for integrating the service control unit SCP and entering the operator code.

If the control unit CONTR2 determines from the directory number N that the call is not directed to a subscriber of the switching center SSP, it sends a request message with the directory number N via the communications units KOM2 and KOM3 to the control unit CONTR3. The latter then sends a return message which indicates the operator code assigned to the directory number N, or that the connection request is directed to a subscriber of the same access network or to a subscriber of an access network which represents the only subscriber access network in a local area. If an operator code has been indicated to the control unit CONTR2, it is entered into the connection request to be transmitted.

It is also possible that not every call to a subscriber who is not a subscriber of the switching center SSP leads generally to the transmission of a request message to the control unit CONTR3. The establishment of a connection for such calls can take place in a very normal manner for example, and the transmission of the request message can first be triggered by a return message indicating that the subscriber cannot be found in the target subscriber access network. Only in that case is the operator code determined by the control unit CONTR3 and entered into the connection request by the control unit CONTR2. The establishment of a connection is then attempted again by routing this changed connection request further.

If the no. 7 signalling system is used between the exchanges of the communications networks LN1 to LN23 and TN1 and TN2, this code can for example be entered analogously to TNS (Transit Network Selection) in the message packet that corresponds to the connection request.

The data bank DB manages a data set which contains an allocation of subscriber network operator codes to directory numbers. In this way for example the directory numbers of the subscribers of access network LN23 are assigned the operator code KLN23. The data bank DB must be adjusted accordingly when the directory number of a subscriber is changed or when a subscriber changes his network operator.

By means of the data bank DB the control unit CONTR3 determines the operator code assigned to a directory number. To that end it accesses the data bank DB with appropriate search algorithms.

It is possible that the switching center SSP is not the subscriber exchange to which the calling subscriber is linked. It could be another exchange of the original subscriber access network to which a connection request is routed, for example when it is determined that a connection request is not directed to a subscriber of the original subscriber access network. It is an advantage that this is a transit exchange which provides the network gateway to the toll network plane.

The switching center SSP can also be an exchange of one of the toll networks TN1 and TN2. Preferably this could be an exchange which connects the subscriber access networks of a local area and contains subscriber access networks of different network operators.

It is also possible for the switching center SSP to be established in a subscriber access network of a local target network area. Entering the operator code would then for example result in the connection request being routed to the wrong subscriber access network.

Figure 3:
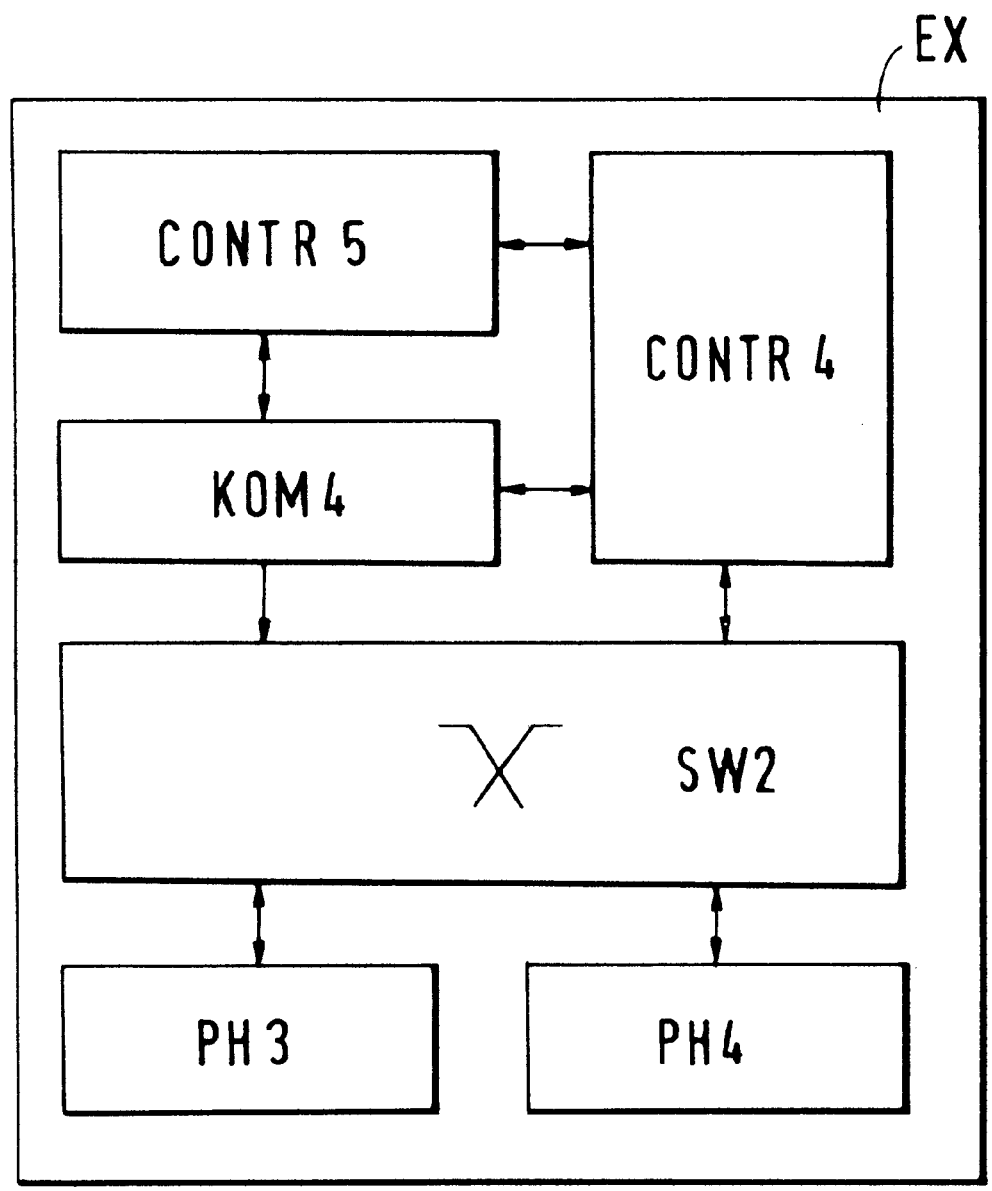
FIG. 3 is a block diagram of an exchange according to the invention for the communications system in FIG. 1.

FIG. 3 is used to explain in detail the structure of an exchange which routes a call by means of an operator code that describes the local network operator.

FIG. 3 illustrates such an exchange EX. The exchange EX contains a switching network SW2, two attachment unit interfaces PH3 and PH4, a communications unit KOM4 and two control units CONTR3 and CONTR4. The attachment unit interfaces PH3 and PH4 and the communications unit KOM4 exchange data via the switching network SW2 which is controlled by control unit CONTR4. A data exchange an also take place via a different communications medium, for example a LAN (Local Area Network). The control unit CONTR5 exchanges control data with the control unit CONTR4 and the communications unit KOM4.

The attachment unit interfaces PH3 and PH4, the switching network SW2 and the control unit CONTR4 are constructed analogously to the attachment unit interfaces PH1 and PH2, the switching network SW1 and the control unit CONTR1 in FIG. 2.

The communications unit KOM4 contains the necessary hardware and software components to receive and transmit similar connection requests.

From the communications unit KOM4 the control unit CONTR4 receives the directory number N entered into the connection request as well as the operator code KLN23. The control unit then determines by means of the operator code KLN23 alone, or by means of the operator code KLN23 and the directory number N, which of the bundles of transverse lines connected to the exchange EX is used to further route the connection request. Control unit CONTR5 then directs this control information to the control unit CONTR4, which then causes this further routing.

What is claimed is:

1. A method of establishing a connection wherein a calling subscriber (A) requests a connection to a called subscriber (B) who is assigned to a geographic area (LOC2) whose number range is shared by a plurality of competing subscriber access networks (LN21 to LN23) of different network operators (OP21 to OP23), and wherein to establish a requested connection, a connection request is routed through one or more communications networks (LN1, TN2) to the subscriber access network (LN23) of the called subscriber (B), comprising the steps of:
transmitting from a calling subscriber's exchange, as part of said connection request, in addition to a directory number (N) which designates the called subscriber (B) within the number range of the geographical area (LOC2), a separate operator code (KOP23) which specifies the particular network operator (OP23) of the subscriber access network (LN23) of the called subscriber (B), and
evaluating the directory number (N) and the operator code (KOP23) to select a subscriber line associated with the called subscriber (B).

2. A method as claimed in claim 1, wherein the operator code (KOP23) is determined from the directory number (N) of the called subscriber (B) and inserted into the connection request.

3. A method as claimed in claim 2, characterized in that the operator code (KOP23) is determined centrally in a central service control unit (SCP).

4. A method as claimed in claim 2, characterized in that the operator code is determined locally in an exchange.

5. A method as claimed in claim 4, wherein the operator code (KOP23) is inserted in the connection request by an exchange (SSP) of that subscriber access network (LN1) to which the calling subscriber (A) is assigned.

6. A method as claimed in claim 4, wherein the operator code is inserted into the connection request by an exchange of a toll network.

7. (Amended) A method as claimed in claim 4, wherein the operator code is inserted in the connection request by an exchange of a destination subscriber access network if the connection request has been routed to an incorrect destination subscriber access network.

8. A method as claimed in claim 7, characterized in that the operator code (KOP23) is evaluated at the interface from the toll area to the local area (LOC2).

9. A method as claimed in claim 7, further comprising the step of:
evaluating the operator code in a subscriber access network to select tie trunks to other subscriber access networks.

10. A method as claimed in claim 9, wherein
a further operator code, which specifies the toll network (TN2) to be used for the establishment of the connection, is transmitted within the connection request.

11. A method as claimed in claim 2, wherein the operator code (KOP23) is entered in the connection request by an exchange (SSP) of that subscriber access network (LN1) to which the calling subscriber (A) is assigned.

12. A method as claimed in claim 2, wherein the operator code is entered in the connection request by an exchange of a toll network.

13. A method as claimed in claim 2, wherein the operator code is entered in the connection request by an exchange of a destination subscriber access network if the call request has been routed to an incorrect destination subscriber access network.

14. A method as claimed in claim 1, characterized in that the operator code (KOP23) is evaluated at the interface from the toll area to the local area (LOC2).

15. A method as claimed in claim 1, characterized in that the operator code is evaluated in a subscriber access network to select tie trunks to other subscriber access networks.

16. A method as claimed in claim 1, wherein a further operator code, which determines the toll network (TN2) to be used for the establishment of the connection, is transmitted within the connection request.

17. An exchange (EX) with a receiver unit (KOM4) for receiving a connection request asking for a connection from a calling subscriber (A) to a called subscriber (B), with means (CONTR5) for evaluating a connection request asking for a connection to a called subscriber (B) of a geographical area (LOC2) whose number range is shared by two or more subscriber access networks (LN21 to LN23) of different network operators (OP21 to OP23), an with means (CONTR4) for further routing a connection request to one of several other exchanges, wherein
the evaluating means (CONTR5) are configured so that the further exchange is specified by means of a separate operator code (KOP23) for a subscriber access network operator (OP23) of the geographical area (LOC2), which operator code is transmitted as part of the connection request in addition to a directory number (N) which specifies the called subscriber (B) within the number range of the geographical area (LOC2).

18. An exchange (SSP) with a receiver unit (KOM1) for receiving a connection request asking for a connection from a calling subscriber (A) to a called subscriber (B), with means (CONTR2) for chanting a connection request asking for a connection to a called subscriber (B) of a geographical area (LOC2), whose number range is shared by a plurality of subscriber access networks (LN21 to LN23) of different network operators (OP21 to OP23), and with means (CONTR1) for further routing the changed connection request, wherein
the means (CONTR2) for changing are configured so that, in addition to a directory number (N) of the called subscriber (B), which is already entered into the number range of the geographical area (LOC2), a separate operator code (KOP23), representing a particular one of said plurality of subscriber access network operators (OP23) of the geographical area (LOC2), is inserted into the connection request.

19. A service control unit (SCP) for establishing a connection from a calling subscriber (A) to a called subscriber (B), with a receiver unit (KOM3) for receiving a directory number (N) which is entered into a connection request asking for the connection, and with means (CONTR3) to evaluate a received directory number (N) which determines the called subscriber (B) within the number range of a geographical area (LOC2), whose number range is shared by a plurality of subscriber access networks (LN21 to LN23) of different network operators (OP21 to OP23), wherein the evaluating means (CONTR3) are configured to determine an operator code (KOP23) representing a particular one of said network operators from the directory number (N) of the called subscriber (B), which identifies the network operator (OP23) of that subscriber access network (LN23) of the geographical area (LOC2) to which the called subscriber (B) is assigned, and that the evaluating means causes this operator code (KOP23) to be inserted into the connection request, in addition to the directory number (N).

* * * * *

UNITED STATES PATENT AND TRADEMARK OFFICE
CERTIFICATE OF CORRECTION

PATENT NO. : 6,091,809
DATED : July 18, 2000
INVENTOR(S) : Stahl et al.

It is certified that error appears in the above-identified patent and that said Letters Patent is hereby corrected as shown below:

At column 9, claim 7, line 1 "(Amended)" should be deleted.

At column 10, claim 17, line 8 "an" should be --and--.

At column 10, claim 18, line 4, "chanting" should be --changing--.

Signed and Sealed this

Seventeenth Day of April, 2001

Attest:

NICHOLAS P. GODICI

Attesting Officer     *Acting Director of the United States Patent and Trademark Office*